(12) United States Patent
Chen et al.

(10) Patent No.: US 9,873,425 B2
(45) Date of Patent: Jan. 23, 2018

(54) DETECTION AND RECONSTRUCTION OF ROLL RATE SENSOR FAULT

(71) Applicant: GM GLOBAL TECHNOLOGY OPERATIONS LLC, Detroit, MI (US)

(72) Inventors: Shih-Ken Chen, Troy, MI (US); Bakhtiar B. Litkouhi, Washington, MI (US); Amir Khajepour, Waterloo (CA); William Melek, Mississauga (CA); Reza Zarringhalam, Waterloo (CA)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 15/097,542

(22) Filed: Apr. 13, 2016

(65) Prior Publication Data

US 2017/0297562 A1 Oct. 19, 2017

(51) Int. Cl.
*B60W 30/02* (2012.01)
*B60T 8/1755* (2006.01)
*B62D 5/04* (2006.01)

(52) U.S. Cl.
CPC ......... *B60W 30/02* (2013.01); *B60T 8/17551* (2013.01); *B62D 5/0457* (2013.01); *B60W 2420/00* (2013.01)

(58) Field of Classification Search
CPC .............. B60W 30/02; B60W 2420/00; B60T 8/17551; B62D 5/0457
See application file for complete search history.

(56) References Cited

U.S. PATENT DOCUMENTS

| | | | |
|---|---|---|---|
| 6,941,205 B2 | 9/2005 | Hrovat et al. | |
| 7,110,870 B2 | 9/2006 | Tseng et al. | |
| 7,133,755 B2 | 11/2006 | Salman et al. | |
| 2006/0020378 A1* | 1/2006 | Salman | B60T 8/885 701/32.9 |
| 2006/0181066 A1* | 8/2006 | Andres | B60R 21/013 280/735 |
| 2009/0276184 A1* | 11/2009 | Mylaraswamy | G01D 18/00 702/185 |
| 2014/0142800 A1* | 5/2014 | Zeng | G06F 11/3055 701/30.6 |

* cited by examiner

*Primary Examiner* — Calvin Cheung
(74) *Attorney, Agent, or Firm* — Quinn IP Law (57) ABSTRACT

A method of reconstructing a detected faulty signal. A roll sensor fault is detected by a processor. A signal of the detected faulty roll sensor is reconstructed using indirect sensor data. The reconstructed signal is output to a controller to maintain stability.

18 Claims, 7 Drawing Sheets

DETECTION AND RECONSTRUCTION OF ROLL RATE SENSOR FAULT

BACKGROUND OF INVENTION

An embodiment relates to state of detecting sensor faults and correcting sensor signals.

Diagnostic monitoring of vehicle stability systems include a variety of sensors monitoring various dynamic conditions of the vehicle. Such systems employ various types of sensors for identifying a status condition of an operation. For example, rollover stability control systems utilize roll rate sensors and pitch rate sensors for detecting a vehicle's instability. In response to detecting the vehicle's instability, corrective actions may be deployed by a vehicle stability control system by actuating one or more vehicle operations (e.g., driving, braking, speed control) to counter the instability condition.

When the sensors are utilized to sense for conditions that contribute to the instability, such sensors are often considered critical. As a result, it must be known when these sensors become faulty. Typically, to assure continued operation of the function so that the operator can pull over or have the car inspected, such a system often utilizes redundant sensors. Redundant sensors are a same set of sensors performing the same function as the primary sensor but are used for backup in the event a primary sensor fail so that a backup sensor may be immediately utilized to provide reliable measurements. Although hardware redundancy (i.e. multiple sensors measuring a specific variable) can ensure reliable operation of vehicle subsystems despite sensor failures, it is not a preferable solution in the automotive industry due to its cost and installation challenges.

SUMMARY OF INVENTION

An advantage of an embodiment is a detection of the fault of a roll sensor and reconstruction of the faulted signal by combining vehicle kinematic and dynamic models with unknown input observers and estimated vehicle states to detect and reconstruct the faults. Robustness to road grade and road bank disturbances is an advantage of the propose structure. The technique described herein utilizes a model, observer, and adaptive fault threshold to ensure faster and more reliable performance. By utilizing the adaptive fault threshold, issues from using fixed thresholds such as disturbances, nonlinearities, and uncertainties which can trigger spikes or larger than normal residual even when no sensor fault is present are reduced. The adaptive threshold may be adjusted to account for detecting both large and small faults based on the dynamic conditions occurring in the vehicle.

An embodiment contemplate a method of reconstructing a detected faulty signal. A roll sensor fault is detected by a processor. A signal of the detected faulty roll sensor is reconstructed by the processor using indirect sensor data. The reconstructed signal is output to a controller to maintain stability.

DETAILED DESCRIPTION

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary and are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify faults in sensors, one of ordinary skill in the art appreciates that an automotive application is merely exemplary, and that the concepts disclosed herein may also be applied to any other system that utilizes roll rate sensing devices.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

Figure 1:
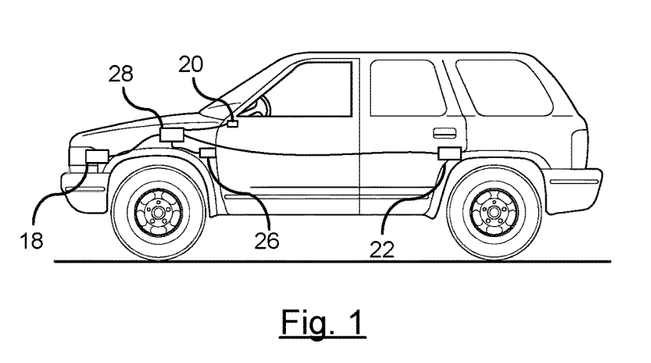
FIG. 1 illustrates a pictorial illustration of a vehicle equipped with stability control sensors
Figure 2:
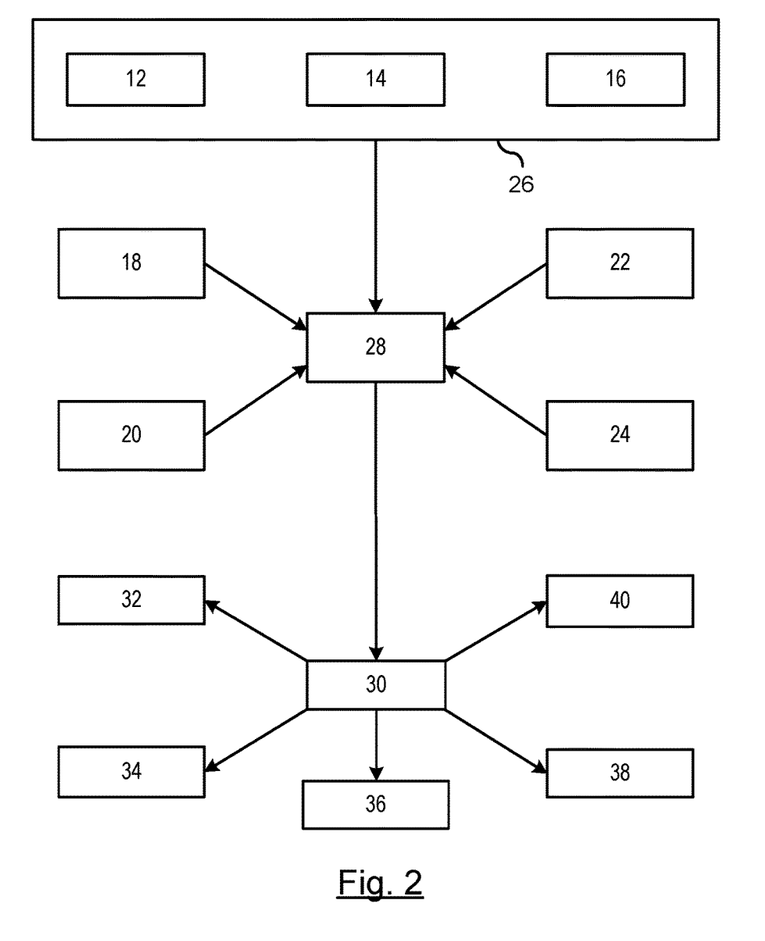
FIG. 2 is a block diagram of a vehicle stability control system.

Vehicle stability control systems utilize a plurality of sensors for sensing vehicle operating conditions and employing one or more control systems to counteract or minimize instability conditions. Referring to FIGS. 1 and 2, a vehicle may be equipped with the following sensors that include, but are not limited to, a pitch rate sensor 12, a roll rate sensor 14, and a yaw rate sensor 16, wheel speed sensors 18, steering sensors 20, suspension sensors 22, and other sensors 24. The pitch rate sensor 12, roll rate sensor 14, and yaw rate sensor 16, as well as other sensors may be integrated with a single module 26.

A processor 28 receives sensed inputs from one or more of the sensors for processing the sensed input data and determining an instability condition. The processor 28 may be part of an existing system, such as traction control system or other system, or can be a standalone processor dedicated to analyzing data from the one or more sensing devices.

The processor 28 may be coupled to one or more output devices such as a controller 30 for initiating or actuating a control action if based on the analysis applied by the processor 28.

The controller 30 may control a braking system 32 wherein the effects of the instability can be minimized or eliminated using vehicle braking.

The controller 30 may control a traction control system 34 which distributes power individually to each respective wheel for reducing wheel slip by a respective wheel.

The controller 30 may control a cruise control system 36 which can deactivate cruise control or restrict the activation of cruise control when instability is detected.

The controller 30 may control a driver information system 40 for providing warnings to the driver of the vehicle concerning the instability condition. It should be understood that the controller 30, as described herein, may include one or more controllers that control an individual function or may control a combination of functions.

The controller 30 may further control the actuation of a wireless communication device 38 for autonomously communicating the instability condition to other vehicles utilizing a vehicle-to-vehicle or vehicle-to-infrastructure communication system.

The controller 30 may be coupled to various other control systems or other systems As set forth earlier, the system relies on obtaining fault-free sensory information, and more importantly when a sensor failure occurs. While utilizing redundant sensors may be robust, redundant sensors are costly and require added packaging space. As a result, the following technique allows the system to not have to utilize redundant sensors and reconstruct the sensor signal as a function of virtual sensor data. For example, a roll rate sensor measures a vehicle's rotational velocity around its longitudinal axis. If the roll rate sensor faults, then incorrect data may be utilized for determining an instability of the vehicle. If a fault is detected, and if no redundant sensors are available, the system must be able to reconfigure the correct signal. Therefore, the first step is determining whether a fault is occurring with the signal. Secondly, if a fault is detected, then reconfiguration of the sensed signal must be determined.

Figure 3:
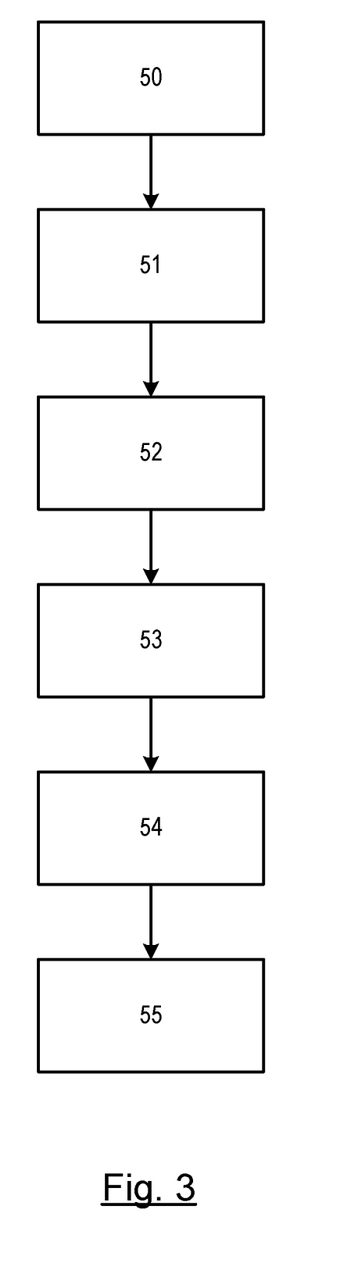
FIG. 3 is a flowchart of a general process flow technique.

FIG. 3 illustrates a flowchart of a broad overview of the process for detecting a fault and reconstructing a signal from the faulted sensor. In step 50, sensor inputs are provided to the processor for analyzing the sensed data. Information is obtained directly from the sensor dedicated to sensing the respective condition. For example, the roll rate sensor is directly responsible for detecting the roll rate of a vehicle. In addition to the measurements from these devices, processor also receives data from other sensor devices that can be used to estimate a virtual roll rate signal. The term virtual as used herein refers to the fact that the data is not received directly from the dedicated sensing device, rather, the data is received from other devices that can indirectly estimate the respective signal.

In step 51, virtual sensor values and residuals are determined. The data from the non-dedicated sensing devices along with a vehicle model is used to calculate the virtual sensor values and residuals. Residuals are defined herein as a difference between the measured values obtained directly from the dedicated sensor devices and virtual sensor values. For example, the residual for the roll rate would be a difference between the measured value from the roll rate sensor and the virtual sensor value calculation for the roll rate.

In step 52, a fault threshold is generated. While a fixed threshold may be utilized, an adaptive threshold is preferably utilized. In utilizing fixed thresholds, disturbances, nonlinearities, and uncertainties may trigger spikes or larger than normal residual even when no sensor fault is present. If a large fixed fault threshold is used to account for concerns, then the detection technique will not be able to detect smaller faults and/or will be slower as higher excitation and more time is required for the residuals to pass the large threshold. If a small fixed threshold is utilized, then the threshold may be too small to detect the fault. As a result, such residuals when using fixed fault thresholds may generate false positives.

As a result, an adaptive threshold is used to detect the faults. An adaptive threshold ensures that the false positives are avoided in nonlinear regions and during harsh maneuvers. Moreover, faster detection of the faults in linear regions and during normal maneuvers can be achieved utilizing the adaptive thresholds in addition to enhanced reliable detection of smaller faults.

The adaptive fault threshold is estimated based on the current driving condition and a dynamic region using a current vehicle model and sensory data. A time window is used to calculate the adaptive threshold for enhancing the reliability in transient driving conditions.

In step 53, a fault is detected based on the calculated residuals exceeding the adaptive fault threshold. This technique checks a criterion to reject short-term outliers and avoid false positives. Outliers can arise from abrupt excitations and sudden disturbances. Outliers can also generate short-term residual anomalies. The criterion monitors a time window to reject the outliers and ensure reliable fault detection performance.

In step 54, in response to detecting the faults, the respective signal is reconstructed. The technique reconstructs the failed signal using virtual sensor values. A weighted average function of the virtual sensors is used to reconstruct the roll rate. The weights are adaptively tuned based on the current driving condition. Utilizing the adaptive weights, a more accurate reconstruction can be achieved for the case of virtual sensor inaccuracies due to various factors that include, but are not limited to, high slips, wheel locks.

In step 55, the reconstructed signal is output to a vehicle control system together with the information relating to the faults.

Figure 4:
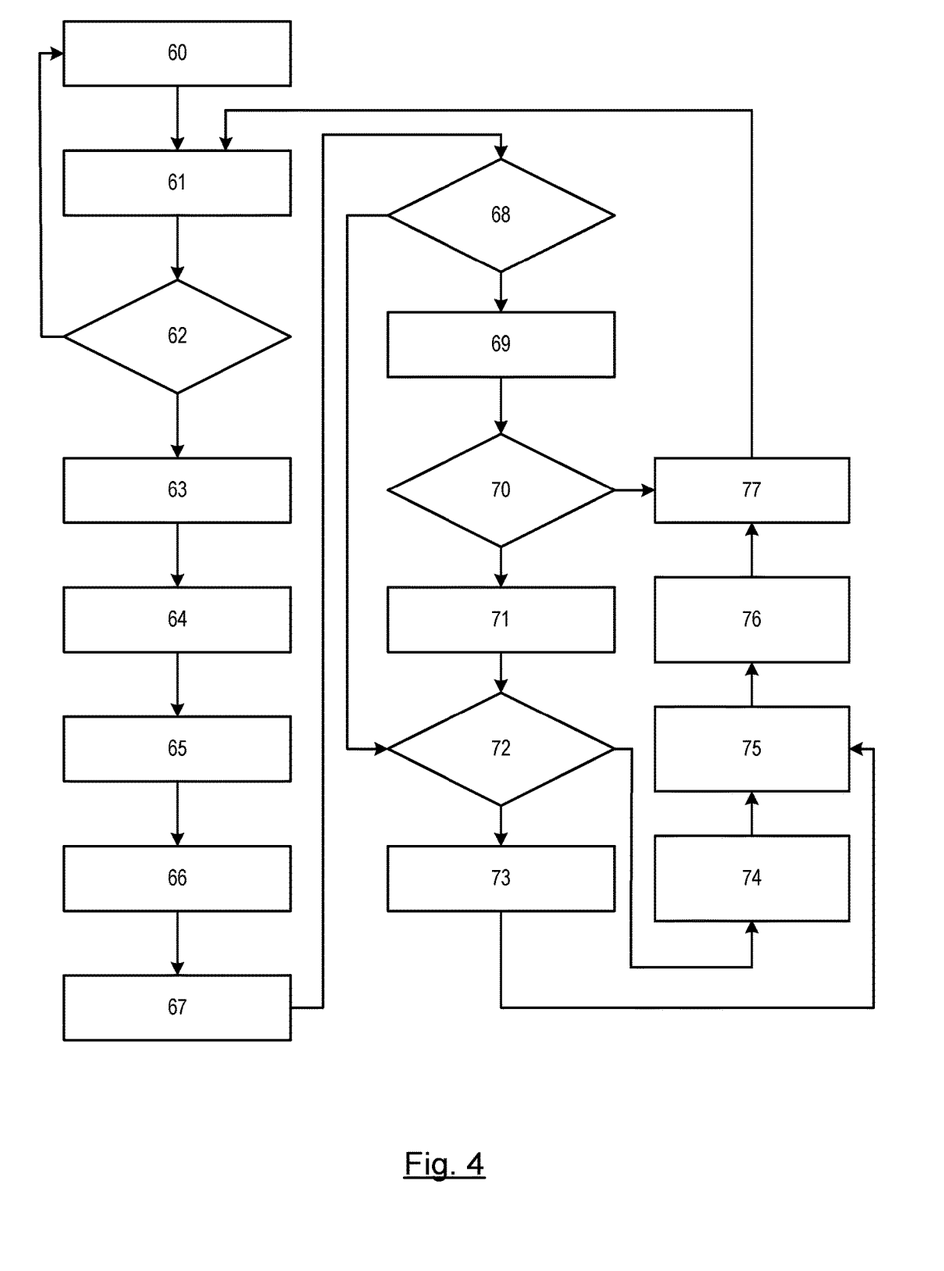
FIG. 4 is a flowchart of the detailed process of detecting a failed sensor and reconstructing the signal.

FIG. 4 is a more detailed flowchart for detecting faults and reconstructing the fault signals. Analytical fault detection methods rely on a system model, constraint equations, and collective information from all available sensors to detect the sensor faults. Sensor fault-tolerance design for a system involves satisfying three main requirements that include fault detection, fault isolation, and fault mitigation. Fault detection is a timely and reliable detection of a sensory fault in the system. Fault isolation is an identification/localization of a faulty sensor. Fault mitigation is the reconstruction of the failed sensory signal using the system model and other non-faulty sensors.

Figure 5:
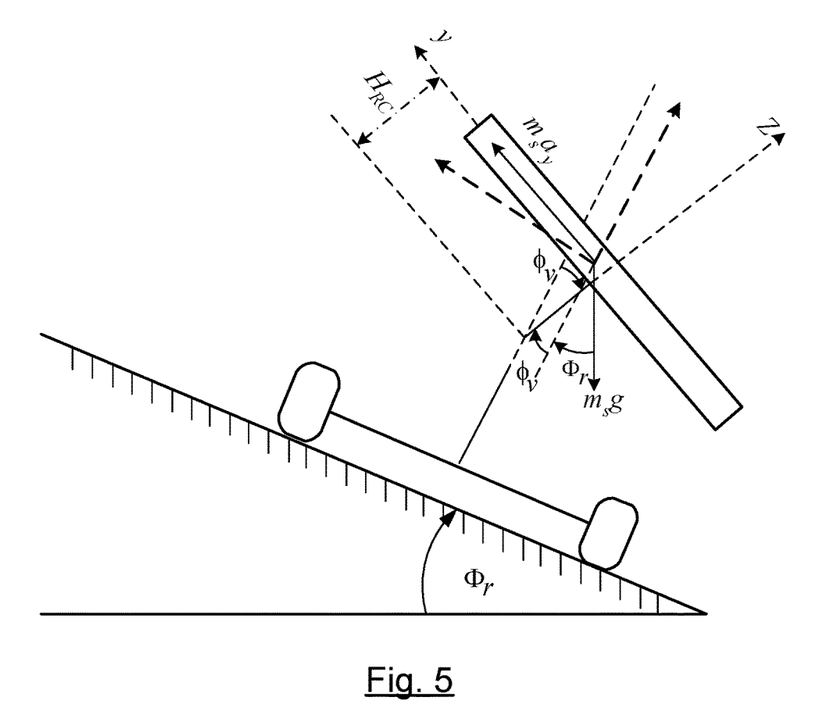
FIG. 5 is an exemplary pictorial illustration of vehicle roll model.

In step, 60, a model is constructed for the monitored system. The model using the roll rate represented as follows:

$$\begin{bmatrix} \dot{\phi}_v \\ \ddot{\phi}_v \end{bmatrix} = \begin{bmatrix} 0 & 1 \\ \frac{-K_\phi}{(I_x + m_s H_{RC}^2)} & \frac{-C_\phi}{(I_x + m_s H_{RC}^2)} \end{bmatrix} \begin{bmatrix} \phi_v \\ \dot{\phi}_v \end{bmatrix} + \begin{bmatrix} 0 \\ \frac{m_s H_{RC}}{(I_x + m_s H_{RC}^2)} \end{bmatrix} [\dot{v}_y + v_x \dot{\psi} + g\sin(\phi_v + \Phi_r)],$$

where $\phi_v$ is the roll angle of the sprung mass; $\dot{\phi}_v$ is the vehicle roll rate; $H_{RC}$ represents a distance between a center of gravity and the roll center; $I_x$ represents moments of inertial about the x axis of the body coordinate system; $\dot{v}_y$ is the rate of change of lateral velocity; $v_x$ represents longitudinal velocity; $\psi$ is the yaw rate; $\Phi_r$ is the road bank angle; $m_s$ is the sprung mass; g is the gravitational acceleration; $C_\varphi$ is the roll damping; and $K_\varphi$ is the stiffness coefficients for roll. A respective pictorial illustration for a roll model is shown in FIG. 5.

The following observer is used to the estimate roll state along with an unknown input. The observer for the roll state is as follows:

$$\hat{x}_\phi[k+1] = E_\phi \hat{x}_\phi[k] + F_\phi y_\phi[k: k+L]$$

$$\hat{u}_\phi[k] = \begin{bmatrix} B_\phi \\ D_\phi \end{bmatrix}^{-1} \begin{bmatrix} \hat{x}_\phi[k+1] - A_\phi \hat{x}_\phi[k] \\ y_\phi[k] - C_\phi x_\phi k \end{bmatrix}$$

where $E_\varphi$ and $F_\varphi$ are the observer gain matrices for the roll observer, where $B_\varphi$ and $D_\varphi$ are bound gain parameters, where $x_\varphi[k]$ is an estimate roll state, and where $\hat{u}_\varphi[k]$ is an estimate of an unknown input.

The following observer is used to estimate the road bank angle ($\Phi_r$) for the roll state as follows:

$$\Phi_r[k] = \sin^{-1}\left(\frac{\hat{u}_\phi[k] - \dot{v}_y[k] - v_x[k]\dot{\psi}[k]}{g}\right) - \phi_v[k].$$

Figure 6:
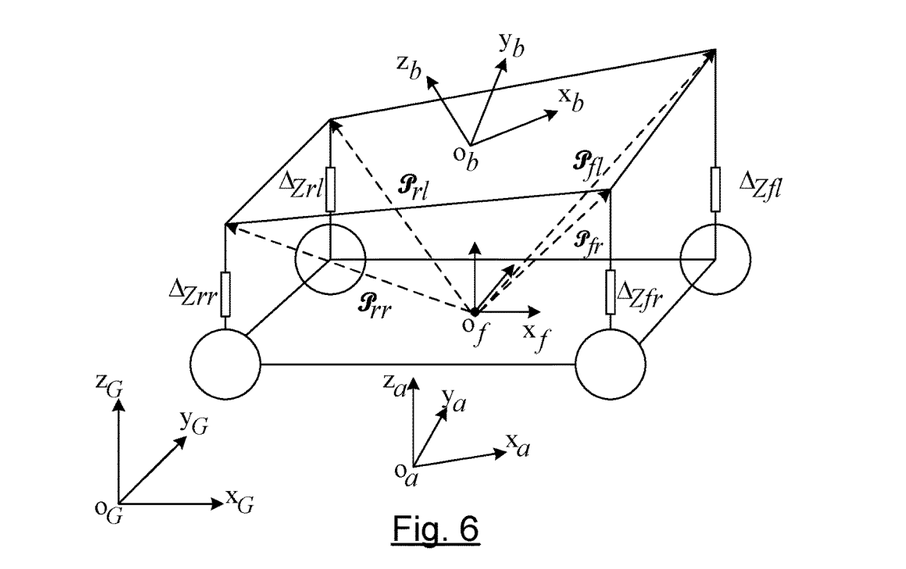
FIG. 6 illustrates sprung mass suspension kinematic model.
Figure 7A:
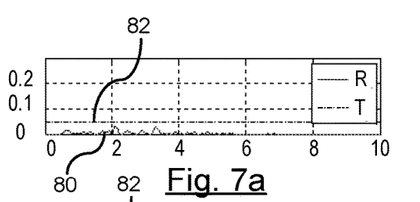
FIGS. 7*a-d* represent exemplary sets of roll data taken at various times instances during a no fault condition.
Figure 7B:
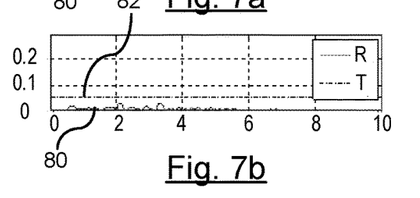
Figure 7C:
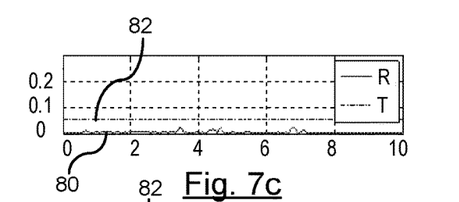
Figure 7D:
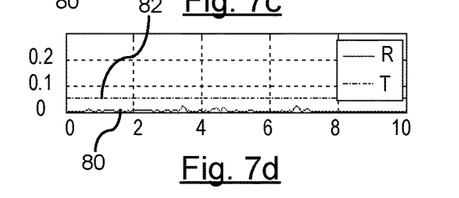

The following inputs are used in the model as derived through a sprung mass kinematic model. The sprung mass kinematics is used to estimate the suspension height at each corner of a vehicle using the measurements from sensors installed on the other three corners of a vehicle as represented by FIG. 6). The roll angle $\varphi_v$ of the vehicle body is estimated using suspension height sensors at each corner. These estimates will be used in the following equations for detection and reconstructions of the sensor faults. Using the sprung mass of model and position of the suspension heights for each corner, the suspension height can be estimated using the sensors installed on the other three corners as:

$$\widehat{\Delta z}_{ij} = -(\mathcal{N}_{-ij}^x \mathcal{P}_{ij}^x + \mathcal{N}_{-ij}^y \mathcal{P}_{ij}^y + d_{-ij})/\mathcal{N}_{-ij}^z$$

where geometric functions $\mathcal{N}_{-ij}^x$, $d_{-ij}$, $\mathcal{P}_{ijx}$, and $\mathcal{P}_{ijy}$ are calculated using corner positions. The subscript ij∈{fl,fr,rl,rr} indicates front-left (fl), front-right (fr), rear-left (rl), and rear-right (rr) corners, and $\widehat{\Delta z}_{ij}$ is the estimated suspension height. The subscript –ij represents a scenario in which the suspension height provided by the sensor ij is not used in the calculations. Furthermore, the roll angle $\hat{\varphi}_{-ij}$ when the suspension height sensor ij is not used can be written as:

$$\hat{\phi}_{-ij} = \cos^{-1}\frac{N_{-ij}^y}{\|N_{-ij}\|}.$$

In step 61, sensory inputs are read or estimated. Sensory inputs include, but are not limited to, suspension heights ($\Delta_{zij}$), roll rate ($\dot{\varphi}_v$), yaw rate ($\dot{\psi}$), longitudinal and lateral acceleration components ($a_x, a_y$), and wheel angular velocity ($\omega_{ij}$).

In step 62, a determination is made as to whether re-initialization is required, such as the vehicle being stationary. If vehicle is stationary, then the routine proceeds back to step 60; otherwise, the routine proceeds to step 63.

In step 63, a roll rate ($\dot{\hat{\varphi}}_{v-ij}$) is determined based on the roll rate model described earlier.

In step 64, a virtual roll rate is determined. The virtual roll rate is determined using the following formula:

$$\dot{\hat{\varphi}}_{-ij} = \dot{\hat{\varphi}}_{v-ij} + R(\hat{\theta}_{v-ij}, \hat{\varphi}_{v-ij})\dot{\hat{\Phi}}_{r-ij}$$

where $\dot{\hat{\varphi}}_{-ij}$ is the estimated vehicle roll rate in the form of a virtual sensor, $\dot{\hat{\varphi}}_{v-ij}$ is the estimated body roll rate calculated using respective vehicle sensors not indexed by ij subscript, R is the rotation matrix describing orientation of vehicle sprung mass with respect to frame reference coordinate system; $\hat{\theta}_{v-ij}$ is the estimated vehicle pitch angle, $\hat{\varphi}_{v-ij}$ is the estimated vehicle roll angle, and $\dot{\hat{\Phi}}_{r-ij}$ is the estimated rate of change of the road bank angle, all calculated using vehicle sensors not indexed by ij subscript.

The virtual roll rate is determined using indirect measurements. That is, the actual roll may be determined using inputs which are direct measurements from sensors dedicated to determining the roll, whereas the virtual roll rate utilizes indirect sensor data that are not necessarily dedicated to detecting the roll, but can be utilized cooperatively with other data to determine the roll.

In step 65, the residuals are determined based off of the measured roll rate and the virtual roll rate. That is, a residual ($R_{\dot{\hat{\varphi}}-ij}$) for the roll rate is determined as a difference between the measured roll rate ($\dot{\varphi}_s$) and the virtual roll rate ($\dot{\hat{\varphi}}_{-ij}$). The residual for the virtual roll rate is determined by the following formula:

$$R_{\dot{\hat{\varphi}}-ij} = |\dot{\varphi}_s - \dot{\hat{\varphi}}_{-ij}|.$$

In step 66, as instantaneous adaptive fault threshold are determined. The instantaneous adaptive fault threshold for the roll rate is determined utilizing the following formula:

$$T_{\dot{\varphi}} = B_{s_{\dot{\varphi}}} + B_{d_{\dot{\varphi}}} |a_y|.$$

where $a_y$ is the lateral acceleration, $B_{s_{\dot{\varphi}}}$ determines a fixed static bound for the threshold, where the constant $B_{d_{\dot{\varphi}}}$ adds a function of the lateral excitations to the threshold.

In step 67, to make the technique robust against false positives in transient regions, evaluation of the instantaneous adaptive fault threshold is performed over a time window. The adaptive threshold for the roll rate over time is represented by the following equation:

$$T_{d_{\dot{\varphi}}} = \max(T_{\dot{\varphi}}(k), T_{\dot{\varphi}}(k-1) \ldots , T_{\dot{\varphi}}(k-W_{\dot{\varphi}})).$$

where $T_{\dot{\varphi}}$ is a dynamic adaptive fault threshold, and where $W_{\dot{\varphi}}$ is a length of the time window during the roll sensing operation to calculate the threshold.

In step 68, a determination is made as to whether an incremental fault state count should be incremented based on whether the residual is greater than the dynamic adaptive fault threshold. The determination for this state for the roll rate is determined by the following equation:

$$R_{\dot{\varphi}-ij} > T_{d_{\dot{\varphi}}}.$$

If the determination is made that the residual is greater than the dynamic adaptive fault threshold, then the routine proceeds to step 69; otherwise, the routine proceeds to step 72.

In step 69, when the residual exceeds the dynamic adaptive fault threshold, a fault state counter ($n_{z_{ij}}$) that is initially set to 0 is incremented. The following formula represents the incrementing formula:

$$n_{z_{ij}}(k) = n_{z_{ij}}(k-1) + 1.$$

In step 70, although every single incident of crossing the adapter threshold can be treated as a fault, a malfunction should persist over a period of time to be identified as a fault. Therefore, a determination is made as to whether the fault is persistent. This is performed by determining whether a residual $R_{z_{ij}}$ is above the dynamic adaptive fault threshold for a consecutive number of times $N_z$. The determination may be represented by the following formula:

$$n_{z_{ij}} > N_z.$$

If the determination is made that the fault is persistent, then the routine proceeds to step 71; otherwise, the routine proceeds to step 77.

In step 71, in response to the routine concluding that the malfunction is persistent, a fault state ($S_{z_{ij}}$) is set to 1.

In step 72, a determination is made as to whether the fault state is set to 1. If the fault state is set to 1, then the routine proceeds to step 73; otherwise, the routine proceeds to step 74.

In step 73, in response to the fault state set to 1, the faulted signal is reconstructed. The reconstruction of the roll rate signal is represented by the following formula:

$$\hat{\dot{\varphi}} = w_{-ij} \hat{\dot{\varphi}}_{-ij}$$

where $\hat{\dot{\varphi}}$ is the reconstructed roll rate signal; $w_{-ij}$ represent weight factors. In response to reconstructing the faulty signal, the routine advances to step 75.

Referring again to step 72 where a determination was made as to whether the fault state set to 1, in response to the fault state not set to 1, the routine proceeded to step 74. In step 74, the fault state count is reset in response to the fault state not set to 1.

In step 75, the fault free signal (e.g., fall free roll rate signal) is provided to an estimation and control module.

In step 76, a fault state is passed to the estimation and control module.

In step 77, the routine waits for the next set of sample data. After receiving the next set of sample data, the routine returns to step 61 where sensory estimated inputs are obtained and recorded.

Figure 8:
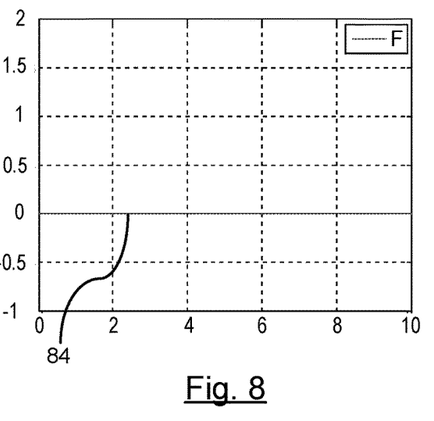
FIG. 8 represents a fault state graph illustrating a no fault condition.

FIGS. 7a-d represents a set of sample data taken at different time instances of time. Residuals and thresholds are plotted on the graphs. The vertical axis is measured in rads/sec and the horizontal axis is measure in seconds. In each graph, the residuals are represented by the line 80 and the threshold is represented by the line 82. If the residual 80 remains lower than the threshold, then no fault is determined. This is shown by the fault state graph illustrated in FIG. 8. A "0" signal indicates a no fault state whereas a "1" signal indicates a detected fault. The fault state signal is represented generally by line 84 which indicates no fault present.

Figure 9:
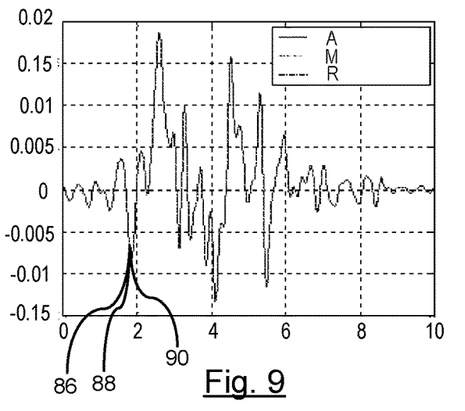
FIG. 9 is a graph comparing actual roll rate of the vehicle, measured signal, and reconstructed signal.
Figure 10A:
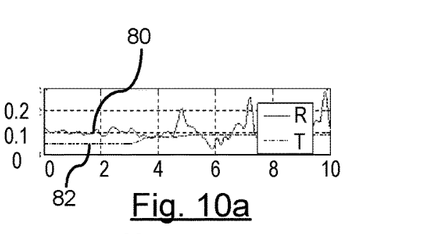
FIGS. 10*a-d* represent exemplary sets of roll data taken at various times instances during a fault condition.
Figure 10B:
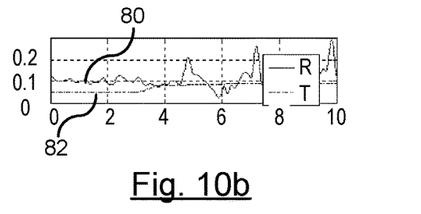
Figure 10C:
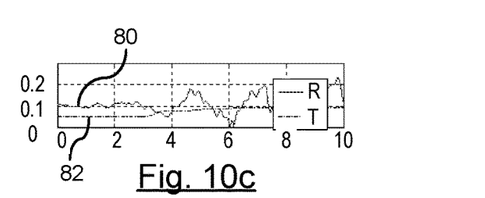
Figure 10D:
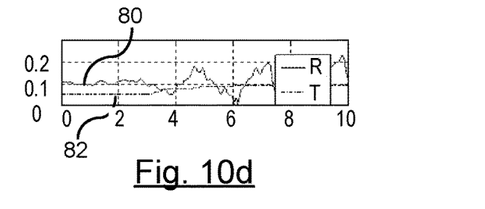

FIG. 9 illustrates a graph illustrating an actual signal 86, a faulted (measured) signal 88, and reconstructed signal 90. Since there is no fault present, each of the respective signals 86, 88, and 90 are the same and overlay one another.

FIGS. 10a-d represents another set of sample data taken at different instances of time. As illustrated in FIGS. 10a-10d, the residuals, represented generally by 80 exceed the thresholds 82 at the start of the data sampling. As a result, the faulted sensor produces a biased signal at the start of the sampling.

Figure 11:
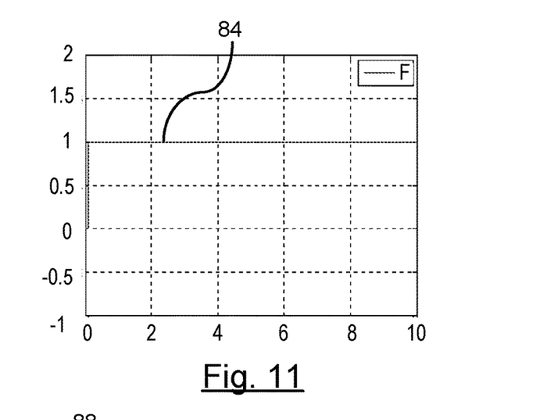
FIG. 11 represents a fault state graph illustrating a fault condition during the entire sampling period.

FIG. 11 illustrates the fault state graph. As shown in FIG. 11, a fault is detected at the onset of the data sampling and the fault is immediately set to "1" as represented by fault state (line) 84.

Figure 12:
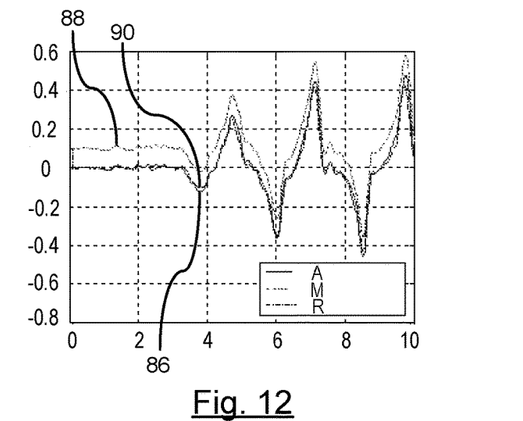
FIG. 12 is a graph comparing an actual roll rate of the vehicle, faulted signal, and reconstructed signal.
Figure 13A:
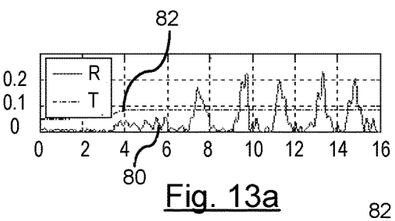
FIGS. 13*a-d* represent exemplary sets of roll data taken at various times instances during a fault condition.
Figure 13B:
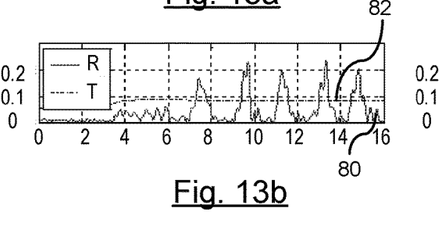
Figure 13C:
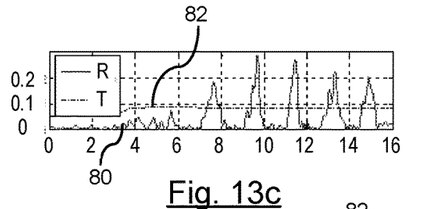
Figure 13D:
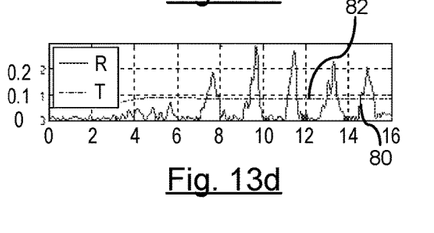

FIG. 12 illustrates a graph illustrating the actual signal 86, the faulted (measured) signal 88, and the reconstructed signal 90. The faulted signal 88 deviates largely with respect to the actual signal 86. The reconstructed signal 90 utilizing the techniques described herein, reconstructs the faulted signal 88 directly from the beginning of the sampling period since the fault occurred at the onset. As a result, the reconstructed signal 90 is substantially similar to the actual signal 86. The reconstructed signal 90 may further be relied upon by other controllers and systems.

FIGS. 13a-d represents yet another set of sample data taken at different instances of time. As illustrated in FIGS. 13a-d, the residuals 80 exceed the thresholds 82 at during the sampling of the data. As shown in FIGS. 13a-d, various portions of the residual 80 signals exceed the thresholds 82 during various times instances of the sampled data. As a result, a fault occurs during a time when the residuals 80 persistently exceed the thresholds 82.

Figure 14:
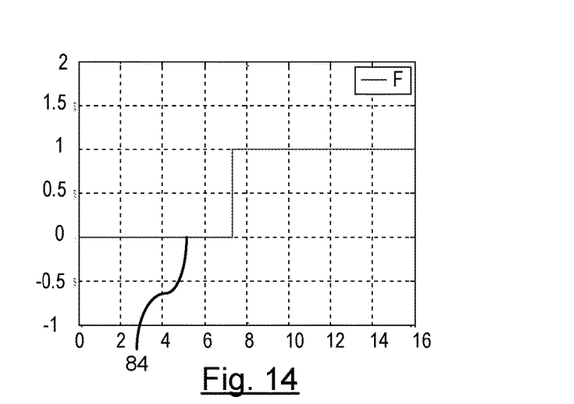
FIG. 14 represents a fault state graph illustrating a fault condition during a portion of the sampling period.

FIG. 14 illustrates the fault state graph. As shown in FIG. 14, a fault is detected in the middle of the sampling period (e.g., 7 sec). The fault signal 84 is unset at the start of the sampling period and then sets to "1" at the 7 sec mark of the sample period and continues to fault throughout the remainder of the sample period.

Figure 15:
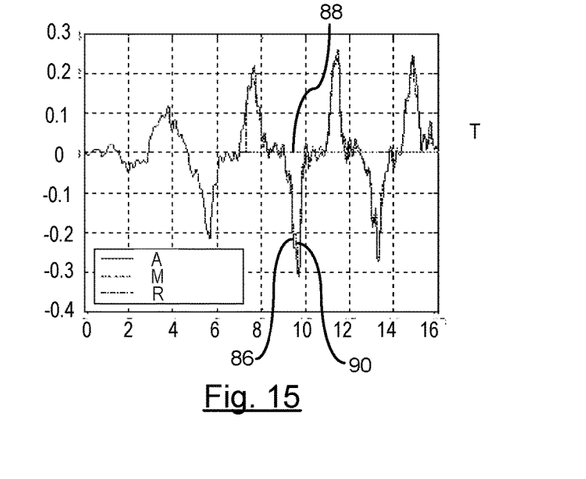
FIG. 15 is a graph comparing an actual signal, faulted signal, and reconstructed signal.

FIG. 15 illustrates a graph illustrating the actual signal 86, the faulted (measured) signal 88, and the reconstructed signal 90. The faulted signal 88 deviates largely with respect to the actual signal 86. The reconstructed signal 90 utilizing the techniques described herein, reconstructs the faulted signal 88 at the 7 second mark when the faults signal is detected. As a result, the faulted signal 88 is reconstructed at the time of failure (7 sec) utilizing the techniques described herein. The reconstructed signal 88 substantially mirrors the actual signal 86 which can thereafter be used to and relied up by other controllers or by other systems.

While certain embodiments of the present invention have been described in detail, those familiar with the art to which this invention relates will recognize various alternative designs and embodiments for practicing the invention as defined by the following claims.

What is claimed is:

1. A method of reconstructing a detected faulty signal comprising the steps of:
    detecting a roll sensor fault by a processor;
    reconstructing, by the processor, a signal of the detected faulty roll sensor using indirect sensor data; and
    outputting the reconstructed signal to a controller to execute a control action on a vehicle system to maintain stability;
    wherein detecting the roll sensor fault by the processor comprises the steps of:
        obtaining sensory data from a faulted roll sensor, the faulted roll sensor dedicated to monitor a roll instability condition,
        obtaining sensory data from at least one non-faulted sensor other than the roll sensor,
        determining a virtual sensor value as a function of the sensory data from the at least one non-faulted sensor,
        generating a residual as a function of the sensory data from the faulted roll sensor and virtual sensor value from the at least one non-faulted sensor,
        comparing the residual to a threshold, and
        detecting the sensor roll fault in response to the residual exceeding the threshold.

2. The method of claim 1 wherein determining a virtual sensor value as a function of the sensory data from the at least one non-faulted sensor is determined utilizing a roll dynamics of a vehicle model and is represented by the following formula:

$$\begin{bmatrix} \dot{\phi}_v \\ \ddot{\phi}_v \end{bmatrix} = \begin{bmatrix} 0 & 1 \\ \frac{-K_\phi}{(I_x + m_s H_{RC}^2)} & \frac{-C_\phi}{(I_x + m_s H_{RC}^2)} \end{bmatrix} \begin{bmatrix} \phi_v \\ \dot{\phi}_v \end{bmatrix} + \begin{bmatrix} 0 \\ \frac{m_s H_{RC}}{(I_x + m_s H_{RC}^2)} \end{bmatrix} [\dot{v}_y + v_x \dot{\psi} + g\sin(\phi_v + \Phi_r)],$$

where $\phi_v$ is the roll angle of the sprung mass, $\dot{\phi}_v$ is the vehicle roll rate, $H_{RC}$ represents a distance between a center of gravity and the roll center, $\dot{v}_y$ is the rate of change of lateral velocity; $v_x$ represents longitudinal velocity; $I_x$ represents a moment of inertia about the x axes of a body coordinate system; $\dot{\psi}$ is the yaw rate; $\Phi_r$ is the road bank angle; $m_S$ is the sprung mass; g is the gravitational acceleration; $C_\phi$ is the roll damping; $K_\phi$ is the stiffness coefficients for roll.

3. The method of claim 2 wherein an observer used to estimate a roll state with an unknown input is represented by the following equation:

$$\hat{x}_\phi[k+1] = E_\phi \hat{x}_\phi[k] + F_\phi y_\phi[k: k+L]$$

$$\hat{u}_\phi[k] = \begin{bmatrix} B_\phi \\ D_\phi \end{bmatrix}^{-1} \begin{bmatrix} \hat{x}_\phi[k+1] - A_\phi \hat{x}_\phi[k] \\ y_\phi[k] - C_\phi x_\phi k \end{bmatrix}$$

where $E_\phi$ and $F_\phi$ are the observer gain matrices for the roll observer, where $B_\phi$ and $D_\phi$ are bound gain parameters, where $x_\phi[k]$ is an estimate roll state, and where $\hat{u}_\phi[k]$ is an estimate of an unknown input.

4. The method of claim 1 wherein the threshold includes an adaptive threshold.

5. The method of claim 4 wherein the adaptive threshold is estimated based on a current driving condition and dynamic region.

6. The method of claim 5 wherein the current driving conditions and dynamic region are determined using the vehicle model and sensory data.

7. The method of claim 4 wherein the adaptive threshold for the roll rate is determined utilizing the following equation:

$$T_{d_\phi} = \max(T_\phi(k), T_\phi(k-1) \ldots, T_\phi(k-W_\phi)):$$

where $T_\phi$ is a respective instantaneous threshold, and where $W_\phi$ is a length of time of the time window during the roll sensing operation to calculate the threshold.

8. The method of claim 7 wherein the instantaneous adaptive threshold is determined utilizing the following equation:

$$T_\phi = B_{s_\phi} + B_{d_\phi}(|a_y|)$$

where $B_{s_\phi}$ is a static bound that determines a fixed minimum value for the threshold, and $B_{d_\phi}$ is a constant gain that adds effects of lateral excitation to the threshold.

9. The method of claim 1 wherein determining a virtual sensor value of the roll rate as a function of the sensory data from the at least one non-faulted sensor is determined utilizing the following equation:

$$\dot{\hat{\phi}}_{-ij} = \dot{\hat{\phi}}_{v-ij} + R(\hat{\theta}_{v-ij}, \hat{\phi}_{v-ij}) \dot{\hat{\Phi}}_{r-ij}$$

where $\dot{\hat{\phi}}_{-ij}$ is the estimated vehicle roll rate in the form of a virtual sensor, $\dot{\hat{\phi}}_{v-ij}$ is the estimated body roll rate calculated using respective vehicle sensors not indexed by ij subscript, R is the rotation matrix describing orientation of vehicle sprung mass with respect to frame reference coordinate system; $\hat{\theta}_{v-ij}$ is the estimated vehicle pitch angle, $\hat{\phi}_{v-ij}$ is the estimated vehicle roll angle, and $\dot{\hat{\Phi}}_{r-ij}$ is the estimated rate of change of the road bank angle, all calculated using vehicle sensors not indexed by ij subscript.

10. The method of claim 9 wherein generating the residual as a function of the sensory data from the faulted roll sensor and the virtual sensor value from the at least one non-faulted sensor is determined by the following equation:

$$R_{\dot{\hat{\phi}}_{-ij}} = |\dot{\phi}_s - \dot{\hat{\phi}}_{-ij}|$$

wherein $\dot{\hat{\phi}}_{-ij}$ is the virtual sensor value and $\dot{\phi}_s$ measured value from the roll rate sensor.

11. The method of claim 1 wherein detecting the sensor fault in response to the residual exceeding the threshold further comprises the step of determining whether the fault persists for a period of time.

12. The method of claim 11 wherein determining whether the fault persists for the period of time further comprises the steps of:
    incrementing a fault count each time the residual exceeds the adaptive threshold;
    detecting the fault when the fault count exceeds a predetermined count threshold.

13. The method of claim 12 wherein the fault count is reset to zero in response to a residual not exceeding the adaptive threshold.

14. The method of claim 1 wherein reconstructing the signal of the detected faulty sensor using indirect sensor data is determined using the following equation:

$$\hat{\varphi} = w_{-ij}\hat{\varphi}_{-ij}$$

where $\hat{\varphi}$ is the reconstructed roll rate signal; $w_{-ij}$ represent weight factors.

15. The method of claim 1 wherein the outputting the reconstructed signal to a controller includes outputting the signal to a vehicle braking system for mitigating a vehicle instability condition.

16. The method of claim 1 wherein the outputting the reconstructed signal to a controller includes outputting the signal to a powertrain control system for mitigating a vehicle instability condition.

17. The method of claim 1 wherein the outputting the reconstructed signal to a controller includes outputting the signal to a vehicle traction control system for mitigating a vehicle instability condition.

18. The method of claim 1 wherein the outputting the reconstructed signal to a controller includes outputting the signal to a steering system for mitigating a vehicle instability condition.

\* \* \* \* \*